(12) United States Patent
Pai

(10) Patent No.: US 9,875,439 B2
(45) Date of Patent: Jan. 23, 2018

(54) LICENSE PLATE RADIO ELECTRONIC IDENTIFIER

(71) Applicant: Daniel Pai, Taichung (TW)

(72) Inventor: Daniel Pai, Taichung (TW)

(73) Assignee: RFID Integrated Marketing Co., Ltd., Taichung (TW)

( * ) Notice: Subject to any disclaimer, the term of this patent is extended or adjusted under 35 U.S.C. 154(b) by 0 days.

(21) Appl. No.: 15/633,789

(22) Filed: Jun. 27, 2017

(65) Prior Publication Data

US 2017/0293832 A1  Oct. 12, 2017

(51) Int. Cl.
*G06K 19/077* (2006.01)
*G08G 1/017* (2006.01)

(52) U.S. Cl.
CPC ....... *G06K 19/07758* (2013.01); *G08G 1/017* (2013.01)

(58) Field of Classification Search
CPC .......................... G06K 19/07758; G08G 1/017
USPC ....................................................... 235/492
See application file for complete search history.

(56) References Cited

U.S. PATENT DOCUMENTS

| 6,025,784 A * | 2/2000 | Mish ...................... G08G 1/017 340/693.5 |
| 6,873,297 B1* | 3/2005 | Posluszny .............. H01Q 1/325 340/693.5 |
| 8,695,243 B1* | 4/2014 | Aldasem ................... G09F 3/20 340/572.7 |
| 2017/0080861 A1* | 3/2017 | Vora ..................... H04N 5/2257 |

* cited by examiner

*Primary Examiner* — Toan Ly

(57) ABSTRACT

A license plate radio electronic identifier is provided. Through an isolated space defined between an RFID tag in an elongate frame of an identifier and a license plate to form a resonant cavity at a slot of a metal film antenna on the RFID tag, the metal film antenna can resonate and sense an electromagnetic wave signal reflected by the surface of the license plate through the resonant cavity. The electromagnetic wave signal of a frequency band is transmitted to a radio frequency identification chip under the action of the frequency band and the field pattern adjustment of the slot and a groove. The overall structure of the identifier serves as radio identification for a vehicle. The identifier is resistant to a metal interference and capable of long distance reading and can be put into mass production and is cost-effective.

4 Claims, 15 Drawing Sheets

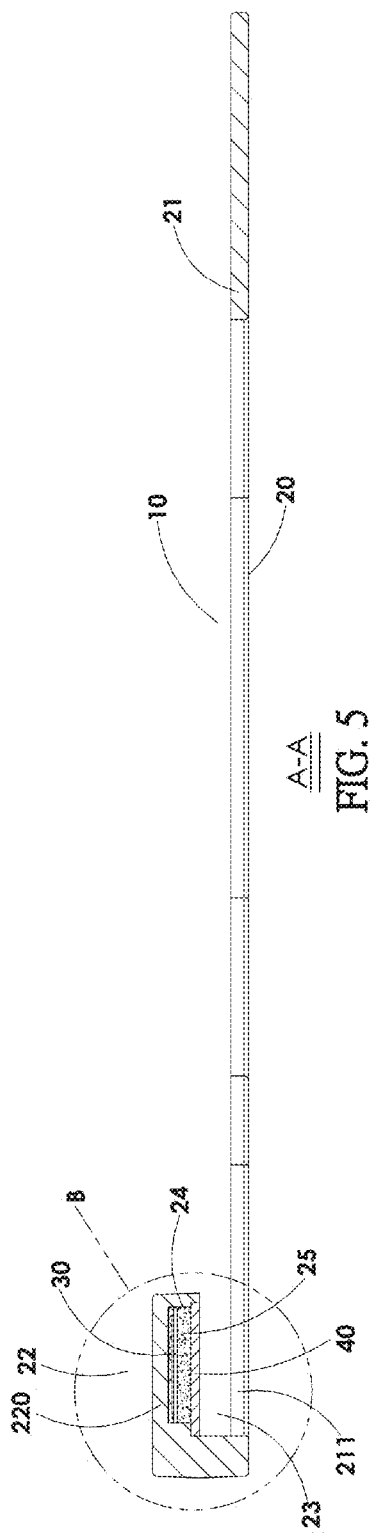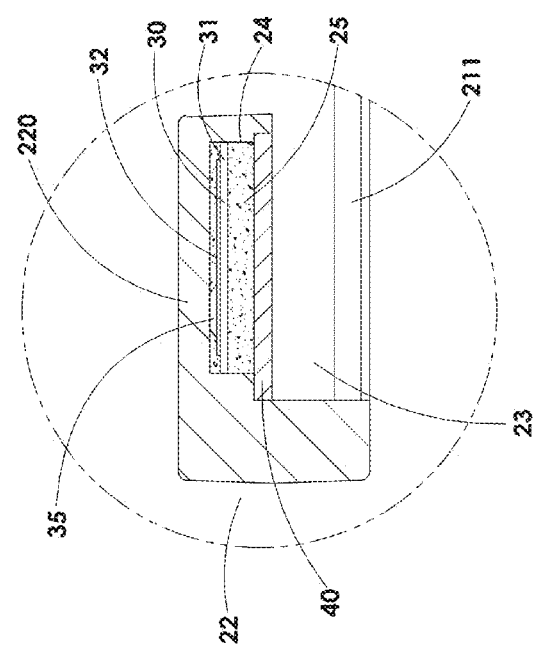

LICENSE PLATE RADIO ELECTRONIC IDENTIFIER

FIELD OF THE INVENTION

The present invention relates to an identifier, and more particularly to a license plate radio electronic identifier that is resistant to a metal interference and capable of long distance reading and can be put into mass production and is cost-effective.

BACKGROUND OF THE INVENTION

Radio Frequency Identification (RFID) is widely used in many fields, such as industrial automation, commercial automation, and transportation control management, and so on. In general, a microstrip antenna itself has the shortcoming of a narrow frequency to cause many restrictions on an antenna design. Most are designed into a single frequency and a narrow frequency. UHF electronic tags often use printed antennas. The majority are microstrip antennas and printed dipoles. If a UHF electronic tag is applied to a license plate, the metallic surface of the license plate makes the signal reflected easily. This may lead to an abnormal signal. Sometimes, the RFID tag cannot be activated and read. A conventional electronic license plate is a combination of an electronic tag and a metallic license plate. The electronic tag is mounted in a slot of the license plate. Although the problem that the metallic surface of the license plate affects the antenna of the electronic tag has been improved and the performances of long distance reading and transmitting signals can be achieved, it still has the problem that the electronic tag mounted in the slot may disengage from the slot. In particular, mounting an electronic license plate is not a policy of the traffic policy. The owner of a vehicle with an unauthorized electronic license plate may be punished because of modification of the license plate. A radio frequency identifier structure mounted to a license plate is commercially available. An outer side of a metal plate integrally formed with an antenna is provided with a slot. An electronic tag is embedded in the slot. The license plate with the electronic tag is mounted to a vehicle as radio frequency identification. Although this way neither modify the license plate and nor transgress against the low, it is a complicated process for the metal plate integrally formed with the antenna to be formed with the slot. Besides, after the electronic tag is placed in the slot, the slot is filled with glue for positioning the electronic tag, and the surface of the glue needs polishing and coating (or painting) and other surface treatment process, resulting in low production capacity (low production efficiency) and high manufacturing costs. Sometimes, due to economic considerations, it affects the popularity of mounting RFID tags to vehicles. Accordingly, the inventor of the present invention has devoted himself based on his many years of practical experiences to solve these problems.

SUMMARY OF THE INVENTION

The primary object of the present invention is to provide a license plate radio electronic identifier which comprises an identifier matching a license plate installed to a vehicle for radio frequency identification by using a radio frequency reader. The identifier comprises a plate holder, an RFID (radio frequency identification) tag, and a sealing sheet. The plate holder is made of an insulating polymeric material by injection molding, and has a plate body. The plate body has a pair of perforations corresponding to a pair of mounting holes of the license plate. One side of the plate body is formed with a tag setting frame portion having an L-shaped cross section. The tag setting frame portion has an elongate frame. A plate receiving groove is formed between the elongate frame and the plate body. The plate body is formed with a through hole extending to a section of the plate receiving groove to expose a portion of an inner side of the elongate frame. The inner side of the elongate frame is formed with an elongate recess corresponding in position to the through hole. The RFID tag is disposed in the elongate recess of the elongate frame, and is an elongate ultrahigh frequency electronic tag corresponding in shape to the elongate recess. The RFID tag has an insulating substrate sheet. One side surface of the insulating substrate sheet is provided with a metal film antenna. The metal film antenna is formed with a slot and a groove in communication with a long side of the slot. Two sides of the groove serve as a circuit pad electrically connected with a radio frequency identification chip. The sealing sheet is a strip made of an insulating plastic material, and is fixed to cover the elongate recess of the elongate frame, so that the RFID tag is sealed in the elongate recess. When the user wants to install the license plate on the vehicle, a long side of the license plate is inserted into the plate receiving groove of the identifier, and the pair of mounting holes of the license plate is aligned with the pair of perforations of the identifier. The license plate and the identifier can be mounted on the vehicle only by using mounting screws inserted through the mounting holes and the perforations. An isolated space is defined between the RFID tag in the elongate frame of the identifier and the license plate to form a resonant cavity at the slot of the metal film antenna on the RFID tag, such that the metal film antenna can resonate and sense an electromagnetic wave signal reflected by the surface of the license plate through the resonant cavity. The electromagnetic wave signal of a frequency band is transmitted to the radio frequency identification chip under the action of the frequency band and the field pattern adjustment of the slot and the groove. The overall structure of the identifier serves as radio identification for the vehicle. The identifier is resistant to a metal interference and capable of long distance reading and can be put into mass production and is cost-effective.

Preferably, the RFID tag is mounted in the elongate recess. The elongate recess is filled with an insulating sealant. Through the insulating sealant, the RFID tag is restricted within the elongate recess, thereby attaining a positioning effect.

Preferably, the slot of the metal film antenna on the RFID tag is a rectangular slot matching the license plate, and the groove is perpendicular to the slot. The inducting frequency band and the field pattern of the electromagnetic wave signal reflected by the license plate can be adjusted through the shape and size of the slot and the width of the groove, so that the RFID tag can achieve the effects of good reading sensitivity and long distance reading in the working frequency band.

Preferably, upper and lower portions of the plate body of the plate holder of the identifier each have the pair of perforations corresponding to the pair of the mounting holes of the license plate. When the user wants to mount the identifier in cooperation with the license plate to the vehicle, the license plate is located at its original position of the vehicle. The license plate may be inserted in the plate receiving groove at the lower end of the identifier, or the license plate may be inserted in the plate receiving groove at the upper end of the identifier. The elongate frame of the identifier is transversely arranged at the lower end edge or the upper end edge of the license plate to maintain a good matching isolated space relative to the metal film antenna of the RFID tag in the elongate recess. When the license plate is mounted on the vehicle, the RFID tag transversely disposed on the surface of the upper edge or the lower edge of the license plate is resistant to a metal interference and capable of long distance reading.

BRIEF DESCRIPTION OF THE DRAWINGS

FIG. 5 is a sectional view taken along line A-A of FIG. 4;

FIG. 6 is an enlarged view of circle B of FIG. 5;

DETAILED DESCRIPTION OF THE PREFERRED EMBODIMENTS

Figure 1:
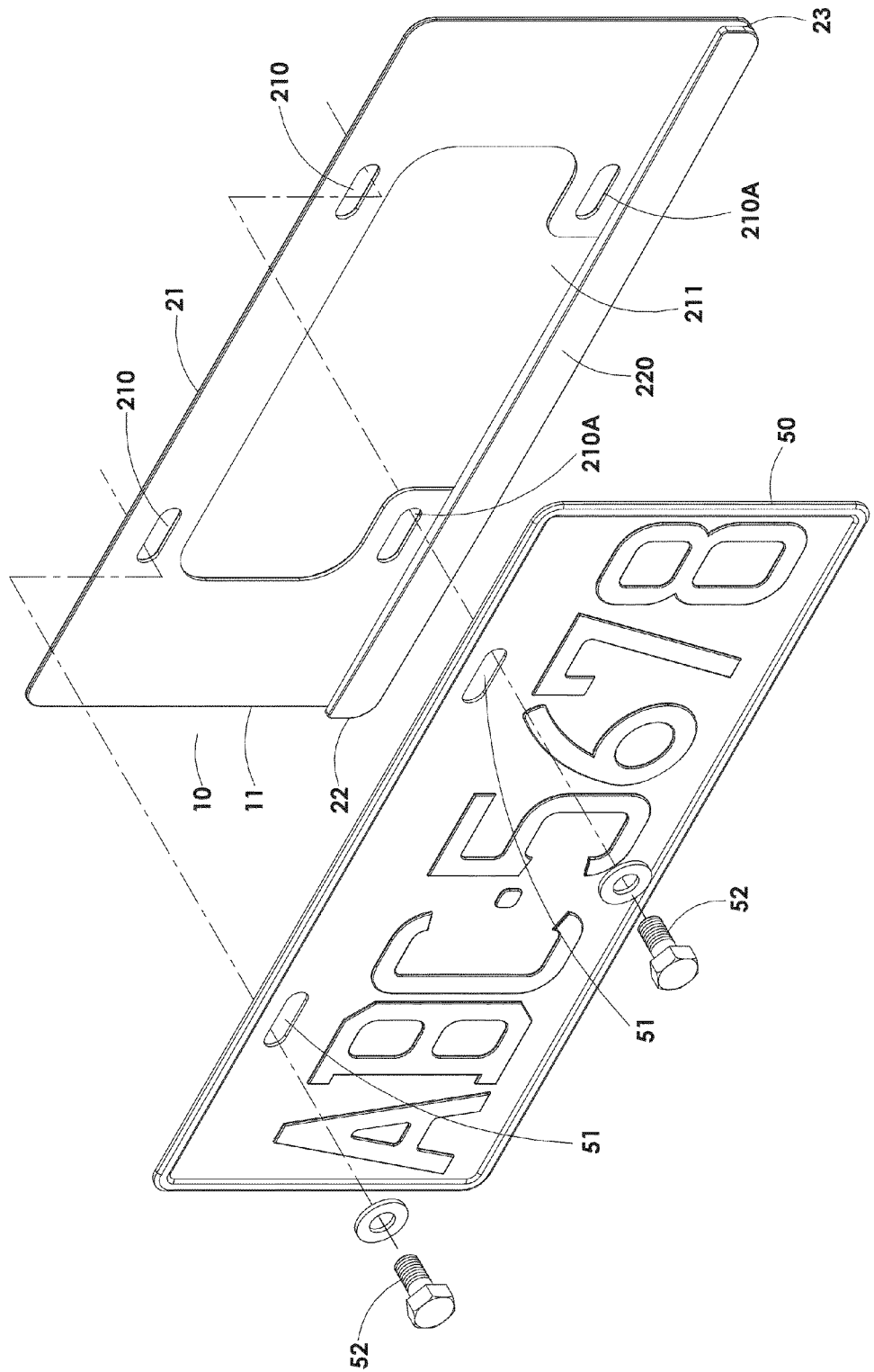
FIG. 1 is a perspective view showing the identifier of the present invention and the license plate before assembled.

Embodiments of the present invention will now be described, by way of example only, with reference to the accompanying drawings.

A license plate radio electronic identifier, as shown in FIG. 1 to FIG. 6, comprises an identifier 10 matching a license plate 50 installed to a vehicle (not shown) for radio frequency identification by using a radio frequency reader (not shown). The identifier 10 comprises a plate holder 20, an RFID (radio frequency identification) tag 30, and a sealing sheet 40.

The plate holder 20 is made of an insulating polymeric (plastic) material by injection molding, and has a plate body 21. The plate body 21 has a pair of perforations 210 corresponding to a pair of mounting holes 51 of the license plate 50. One side of the plate body 21 is formed with a tag setting frame portion 22 having an L-shaped cross section. The tag setting frame portion 22 has an elongate frame 220. A plate receiving groove 23 is formed between the elongate frame 220 and the plate body 21. The plate body 21 is formed with a through hole 211 extending to a section of the plate receiving groove 23 to expose a portion of an inner side of the elongate frame 220. The inner side of the elongate frame 220 is formed with an elongate recess 24 corresponding in position to the through hole 211.

The RFID tag 30 is disposed in the elongate recess 24 of the elongate frame 220, and is an elongate ultrahigh frequency electronic tag corresponding in shape to the elongate recess 24. The RFID tag 30 has an insulating substrate sheet 31 which may be a polyimide (PI) sheet or an epoxy glass fiber (PR4) sheet. One side surface of the insulating substrate sheet 31 is provided with a metal film antenna 32 which may be an aluminum foil or copper foil film antenna. The metal film antenna 32 is formed with a slot 33 and a groove 34 in communication with a long side of the slot 33. Two sides of the groove 34 serve as a circuit pad electrically connected with a radio frequency identification chip (RFIDIC) 35.

The sealing sheet 40 is a strip made of an insulating plastic material, which is fixed to cover (seal) the elongate recess 24 of the elongate frame 220, so that the RFID tag 30 is sealed in the elongate recess 24.

Figure 3:
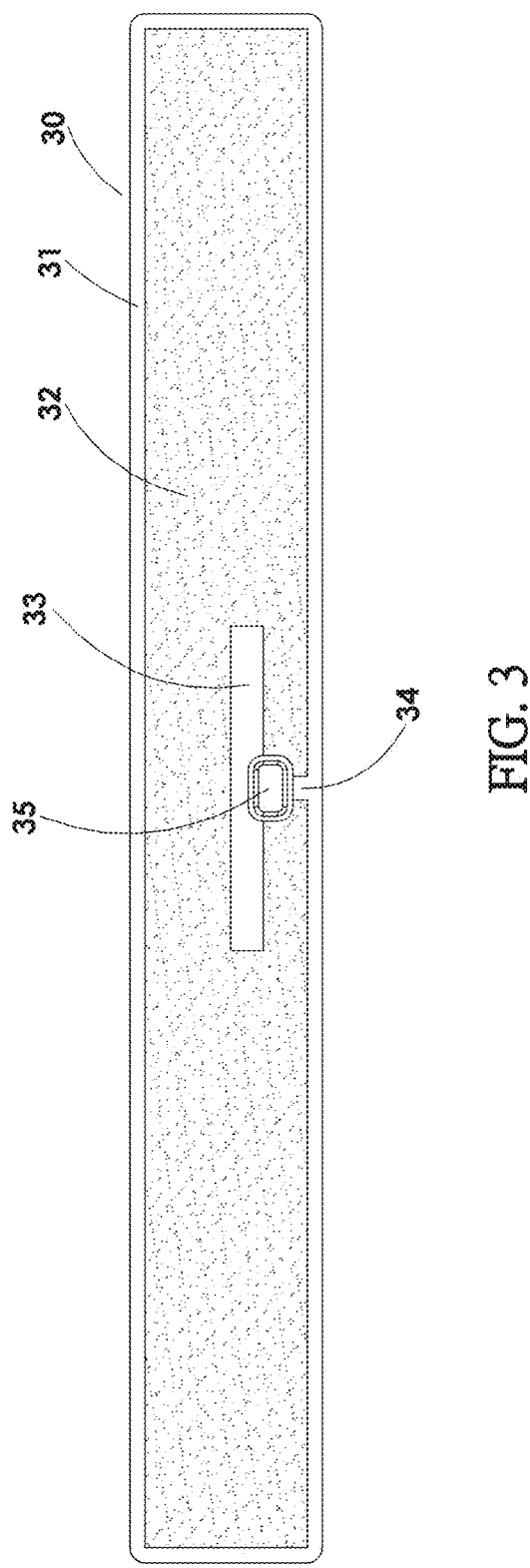
FIG. 3 is a front view of the RFID tag of the present invention.
Figure 4:
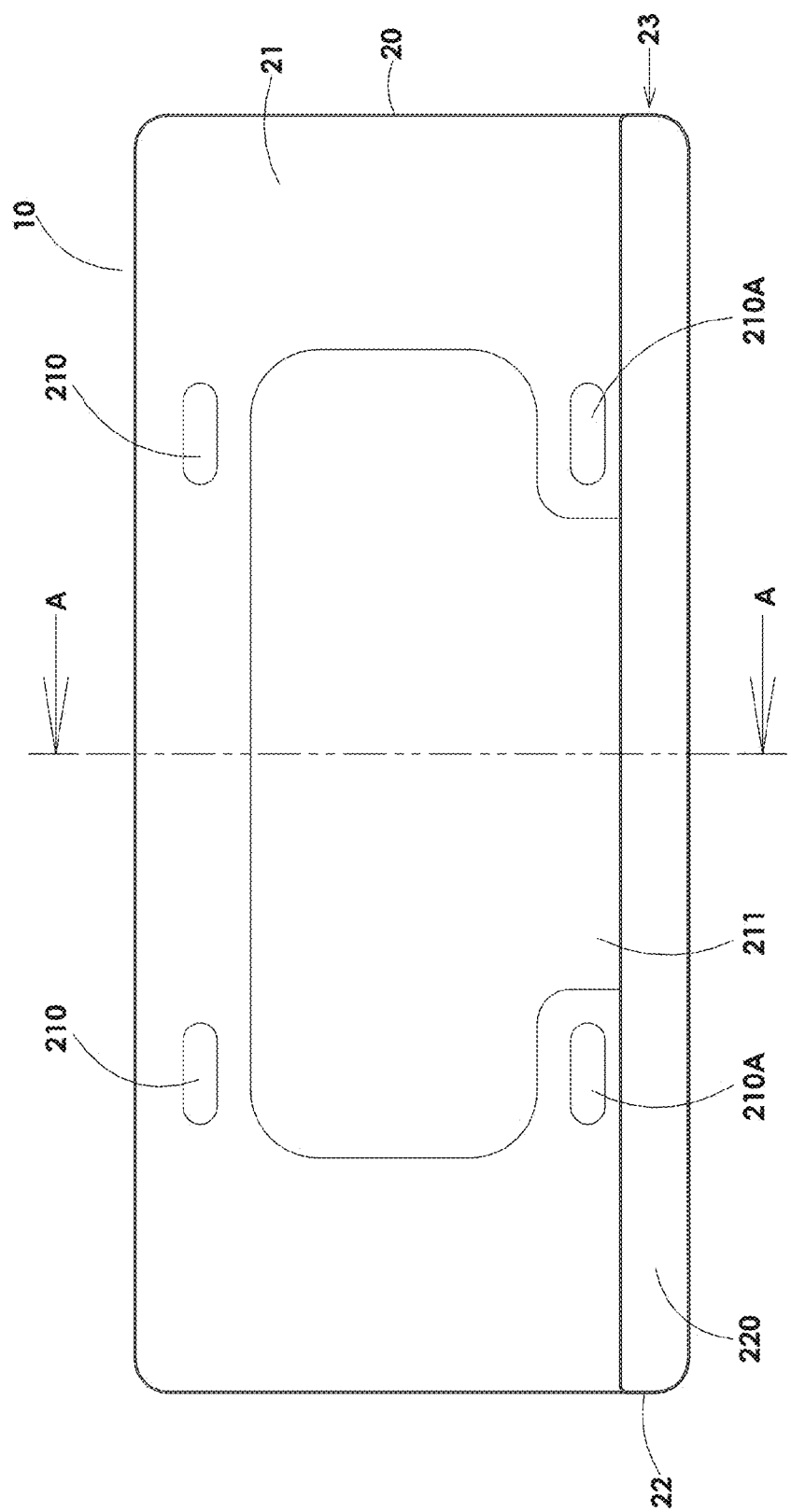
FIG. 4 is a front view of the identifier of the present invention.
Figure 7:
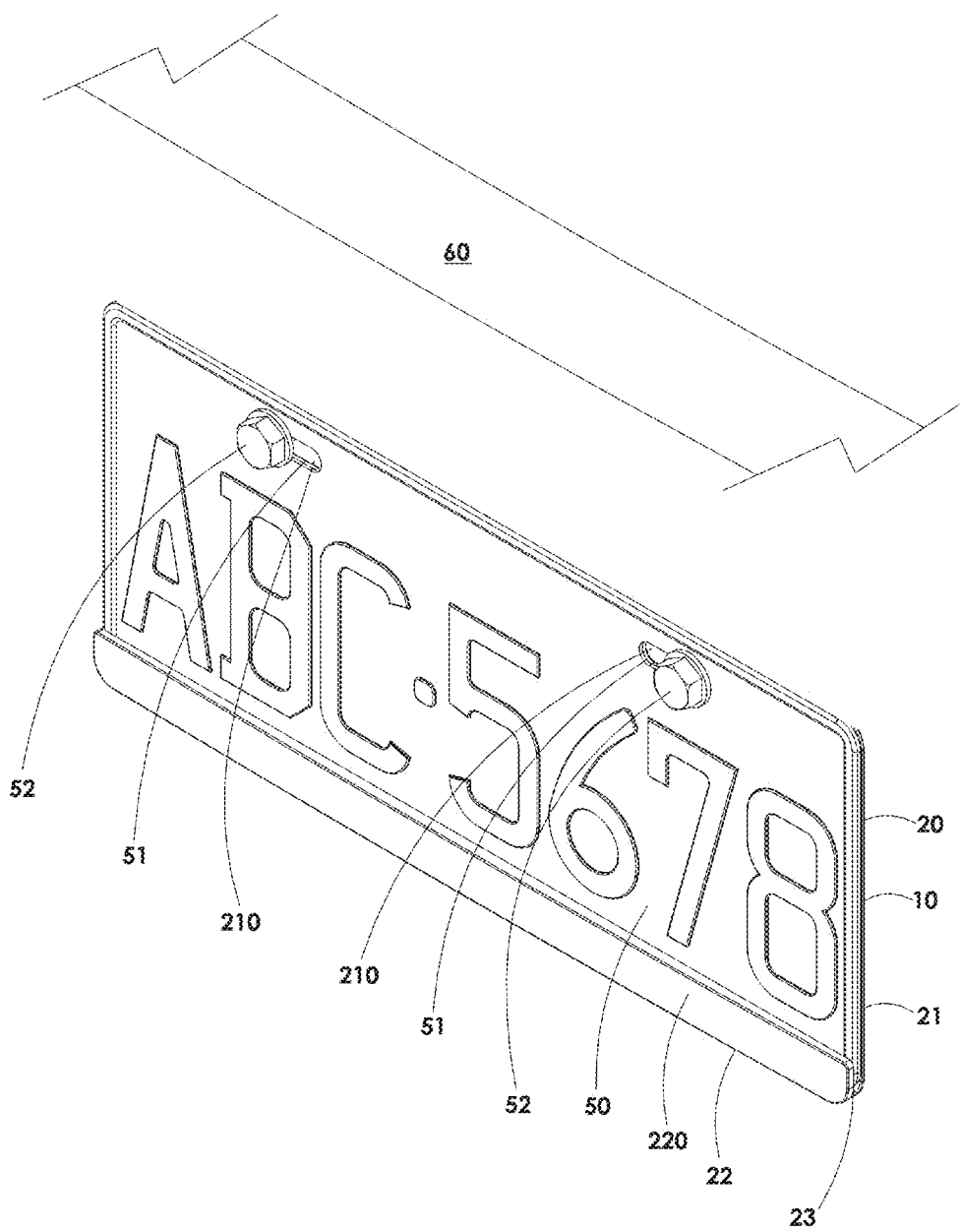
FIG. 7 is a perspective view of the present invention in conjunction with the license plate mounted on the vehicle.
Figure 8:
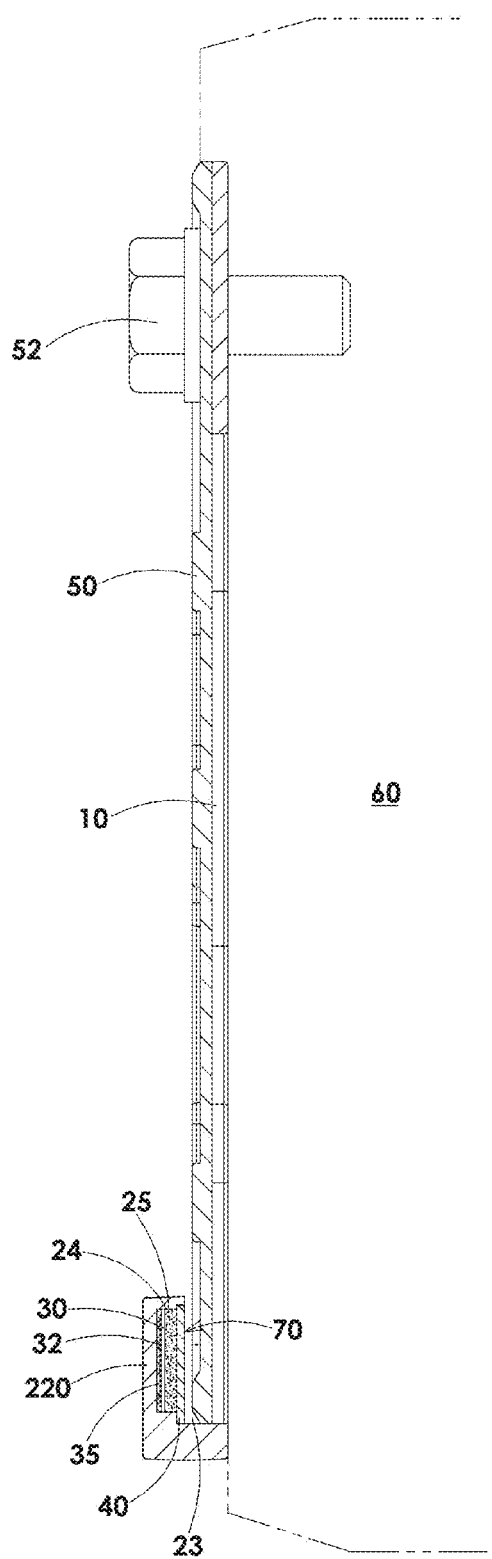
FIG. 8 is a sectional view of the present invention in conjunction with the license plate mounted on the vehicle.

When the user wants to install the license plate 50 on the vehicle, a long side of the license plate 50 is inserted into the plate receiving groove 23 of the identifier 10, and the pair of mounting holes 51 of the license plate 50 is aligned with the pair of perforations 210 of the identifier 10. As shown in FIG. 1, FIG. 7 and FIG. 8, the license plate 50 and the identifier 10 can be mounted on the vehicle 60 only by using mounting screws 52 inserted through the mounting holes 51 and the perforations 210. An isolated space 70 is defined between the RFID tag 30 in the elongate frame 220 of the identifier 10 and the license plate 50, as shown in FIG. 3 and FIG. 8, to form a resonant cavity at the slot 33 of the metal film antenna 32 on the RFID tag 30, such that the metal film antenna 32 can resonate and sense an electromagnetic wave signal reflected by the surface of the license plate 50 through the resonant cavity. The electromagnetic wave signal of a frequency band is transmitted to the radio frequency identification chip 35 under the action of the frequency band and the field pattern adjustment of the slot 33 and the groove 34. As shown in FIG. 7, the overall structure of the identifier 10 serves as radio identification for the vehicle 60. The identifier is resistant to a metal interference and capable of long distance reading and can be put into mass production and is cost-effective.

Figure 2:
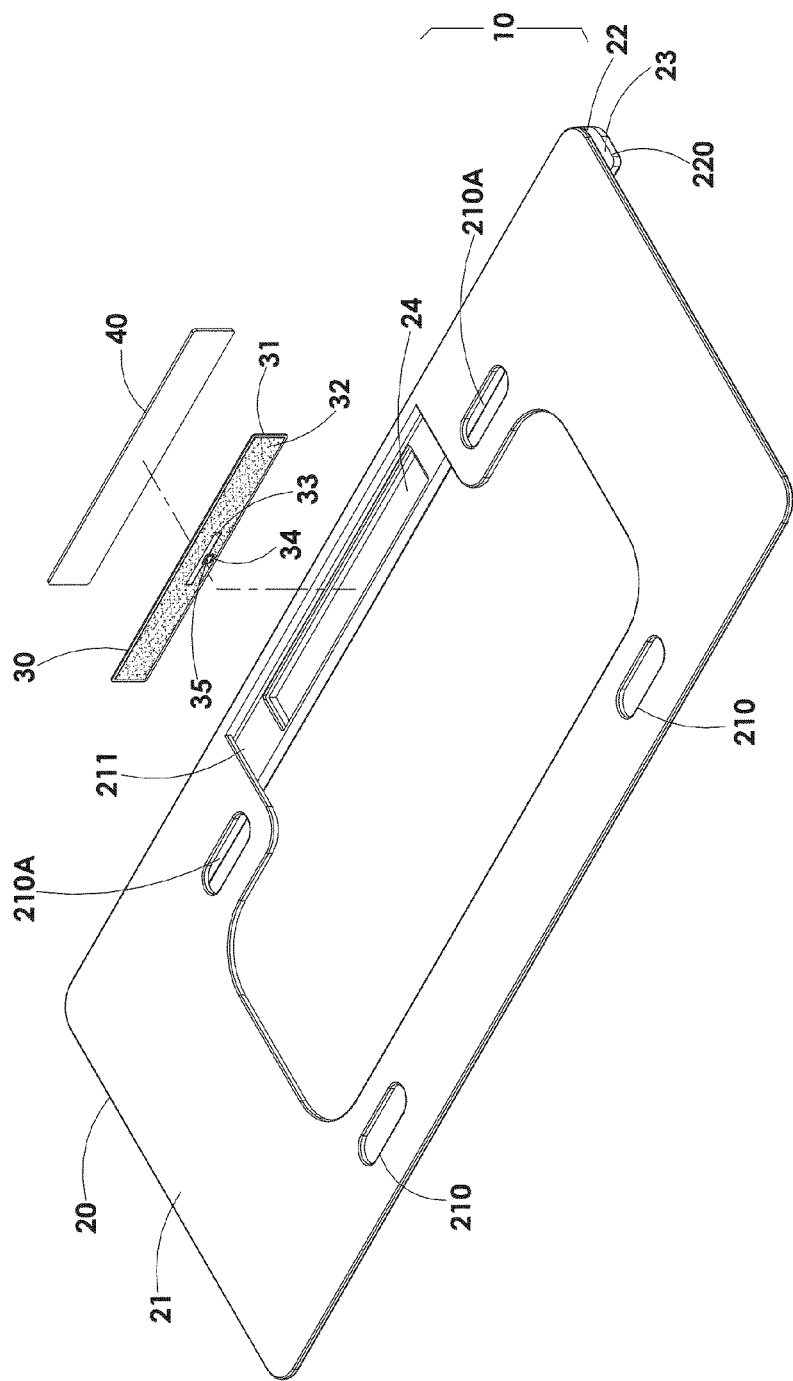
FIG. 2 is an exploded view of the identifier of the present invention.

According to the aforesaid embodiment, the RFID tag 30 is mounted in the elongate recess 24, as shown in FIG. 2, FIG. 5 and FIG. 6. The elongate recess 24 is filled with an insulating sealant 25 which may be silicone. Through the insulating sealant 25, the RFID tag 30 is restricted within the elongate recess 24, thereby attaining a positioning effect.

Figure 11:
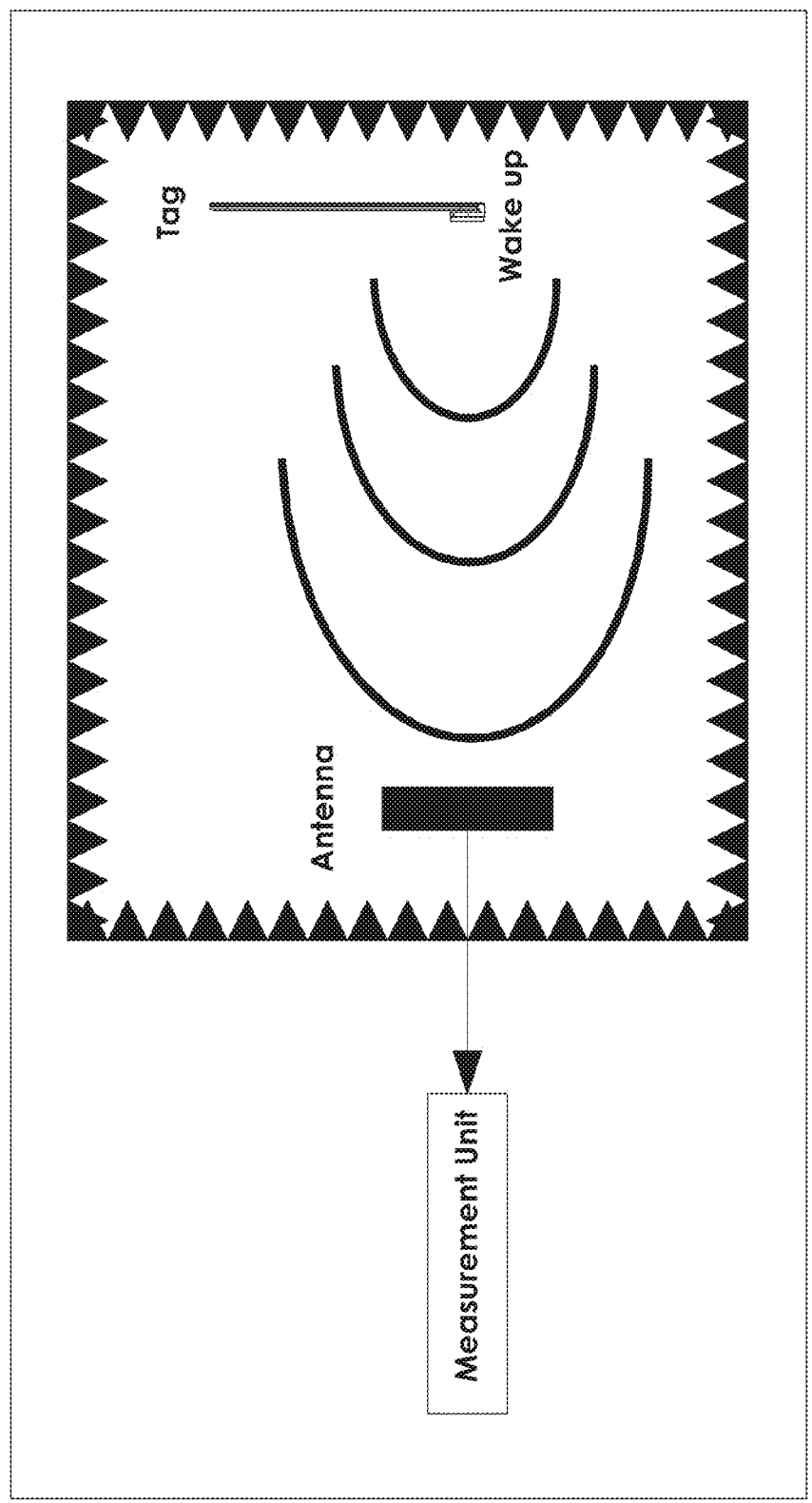
FIG. 11 is a schematic view showing the arrangement of the present invention in a testing room for a reading test.
Figure 12:
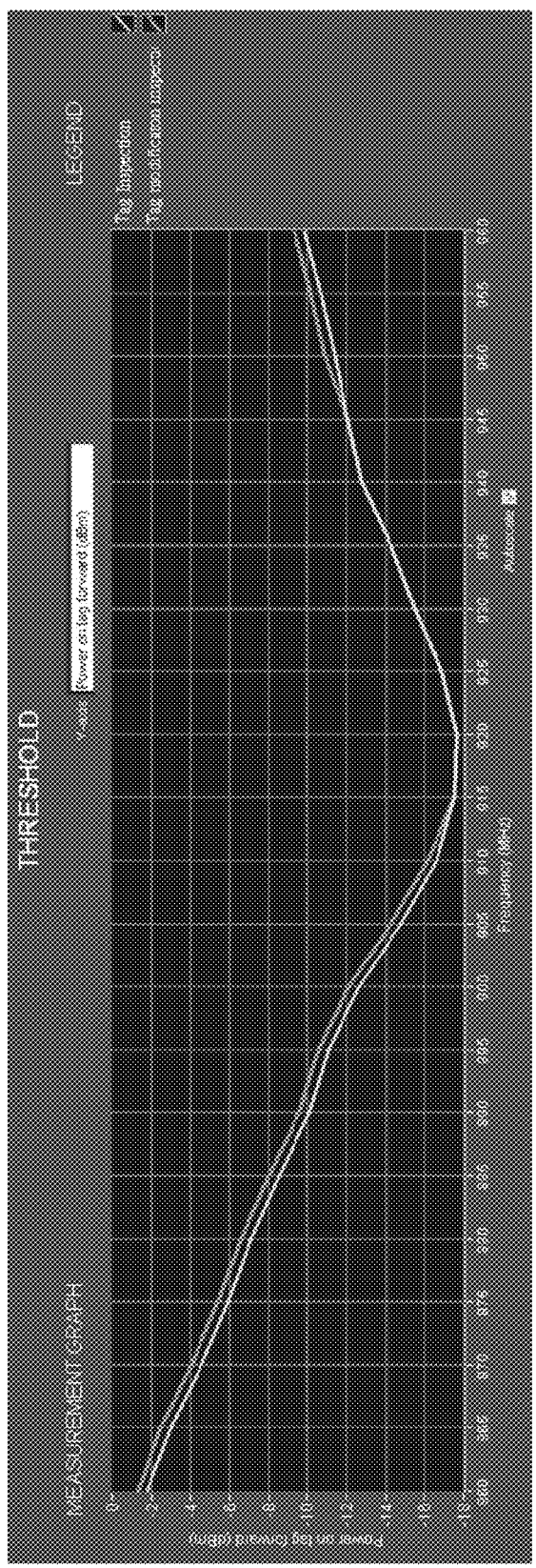
FIG. 12 is a display image of the reading test of the present invention.
Figure 13:
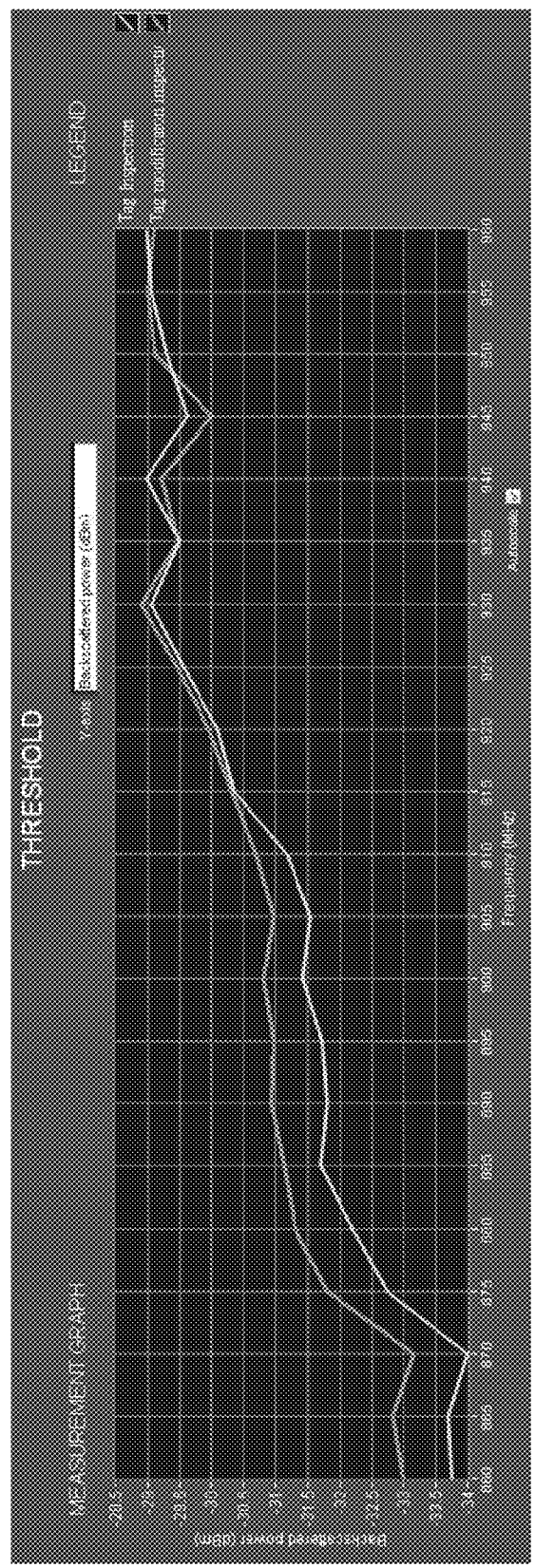
FIG. 13 is a display image of the feedback dBm value of the reading test of the present invention.
Figure 14:
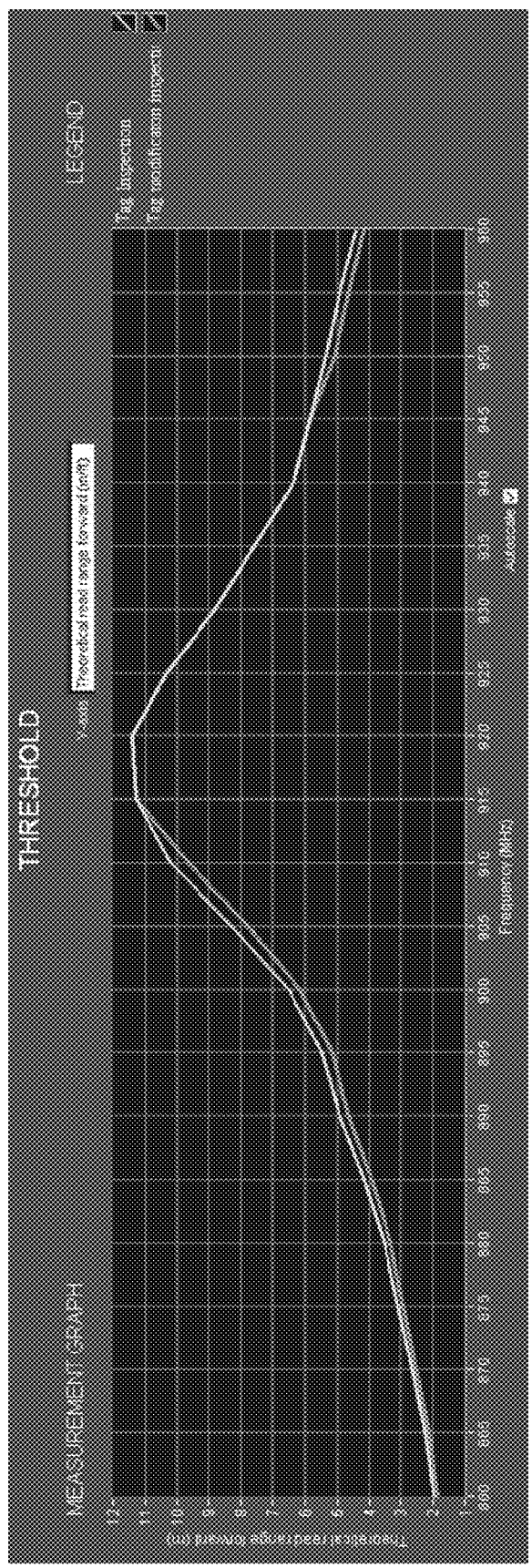
FIG. 14 is a display image of the reading distance of the reading test of the present invention.
Figure 15:
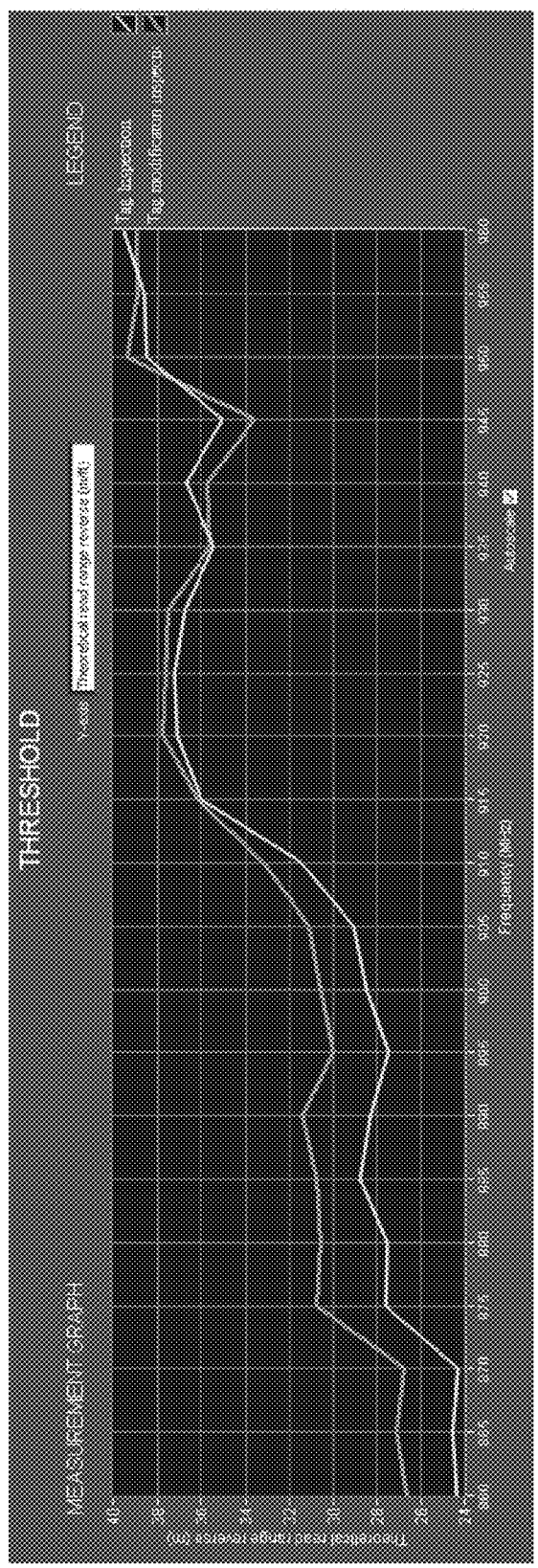
FIG. 15 is a display image of the reading feedback distance of the reading test of the present invention.
Figure 16:
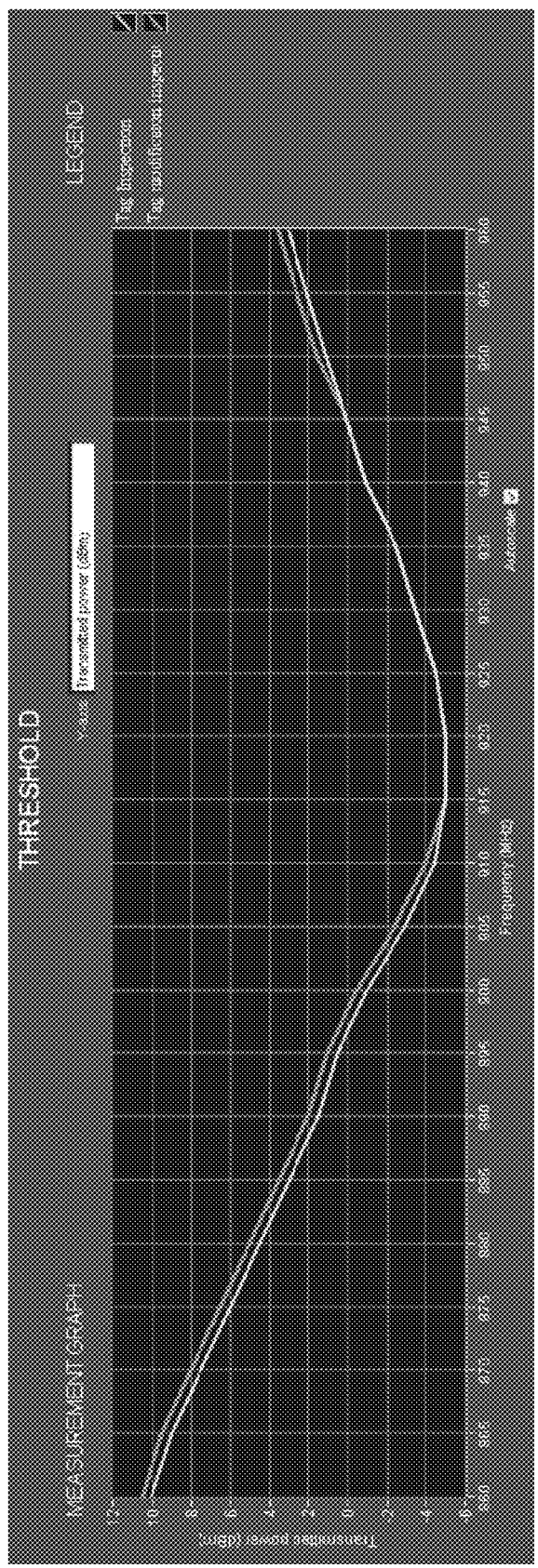
FIG. 16 is a display image of the reading start dBm value of the reading test of the present invention.

According to the aforesaid embodiment, as shown in FIG. 1, FIG. 2 and FIG. 3, the slot 33 of the metal film antenna 32 on the RFID tag 30 is a rectangular slot matching the license plate 50, and the groove 34 is perpendicular to the slot. The inducting frequency band and the field pattern of the electromagnetic wave signal reflected by the license plate 50 can be adjusted through the shape and size of the slot 33 and the width of the groove 34, so that the RFID tag 30 can achieve the effects of good reading sensitivity and long distance reading in the working frequency band. That is, most countries or regions will regulate the working frequency band of the electronic tags (RFIDTAG). For example, in Taiwan, the working frequency band is in the range of 920-930 $MH_z$. The RFID tag 30 uses the shape and size of the slot 33 and the width of the groove 34 to adjust the inducting frequency band and the field pattern of the electromagnetic wave signal so as to complete the identifier 10. As shown in FIG. 11, the identifier is assembled on a license plate in a testing room for a reading test. As shown in FIG. 12, it is shown that the identifier 10 has a reading sensitivity of −17.5 dBm (close to the setting of −16 dBm of the IC factory) in the 920 MHz frequency band, indicating that the identifier 10 has good readability in the 920-930 MHz frequency band (Taiwan). As shown in FIG. 13, it is shown that after the radio frequency identification chip (RFIDIC) of the RFID tag 30 receives a wave start in the 920-930 MHz frequency band, and the feedback value to the testing equipment (antenna) is −29 dBm. This means the identifier 10 has good feedback sensitivity in the 920-930 MHz frequency band (Taiwan). As shown in FIG. 14, when the identifier 10 is in the 920-930 $MH_Z$ frequency band, the theoretical reading distance is 11.5 meters. The actual reading distance (because the power of the equipment is increased) is about 1.5 times longer than the theoretical reading distance. This means that the reading distance of the identifier 10 in the 920-930 $MH_Z$ frequency band (Taiwan) can be up to about 17 meters. As shown in FIG. 15, when the identifier 10 is in the 920-930 $MH_Z$ frequency band, the theoretical feedback reading distance is 37 meters. The actual feedback reading distance (because the power of the equipment is increased) is about 1.5 times longer than the theoretical feedback reading distance. This means that the feedback reading distance of the identifier 10 in the 920-930 $MH_Z$ frequency band (Taiwan) can be up to about 55 meters. As shown in FIG. 16, it is shown that when the identifier 10 is in the 920-930 $MH_Z$ frequency band, the radio frequency identification chip 35 of the RFID tag 30 only needs little radio wave (less than 0 dBm) to be started. This means that the identifier 10 in the 920-930 $MH_Z$ frequency band (Taiwan) is sensitive to the reading start. Through the above test, it is confirmed that the identifier 10 of the present invention can be combined with the license plate, and is resistant to a metal interference and capable of long distance reading.

Figure 9:
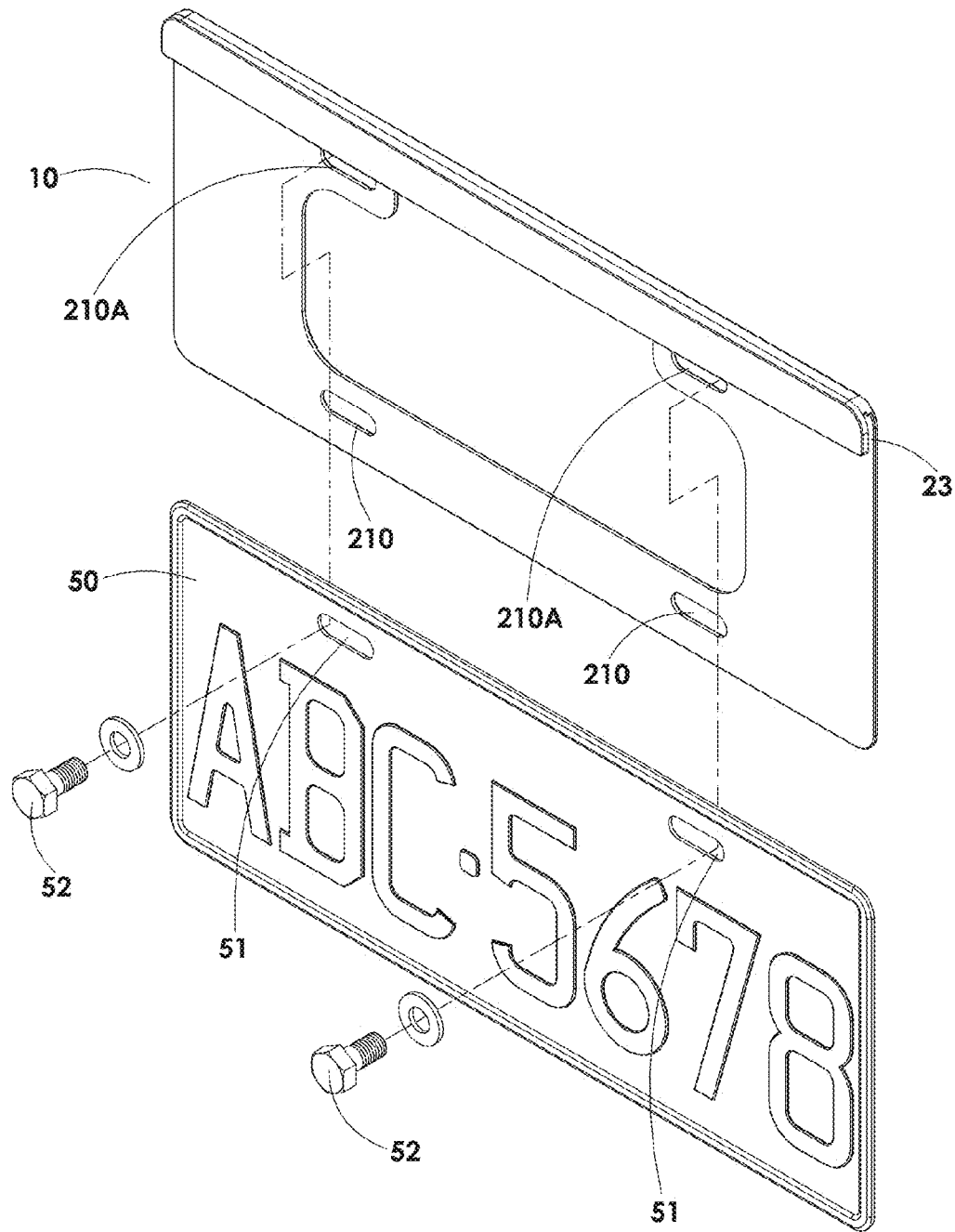
FIG. 9 is a perspective view of another embodiment of the identifier of the present invention and the license plate before assembled.
Figure 10:
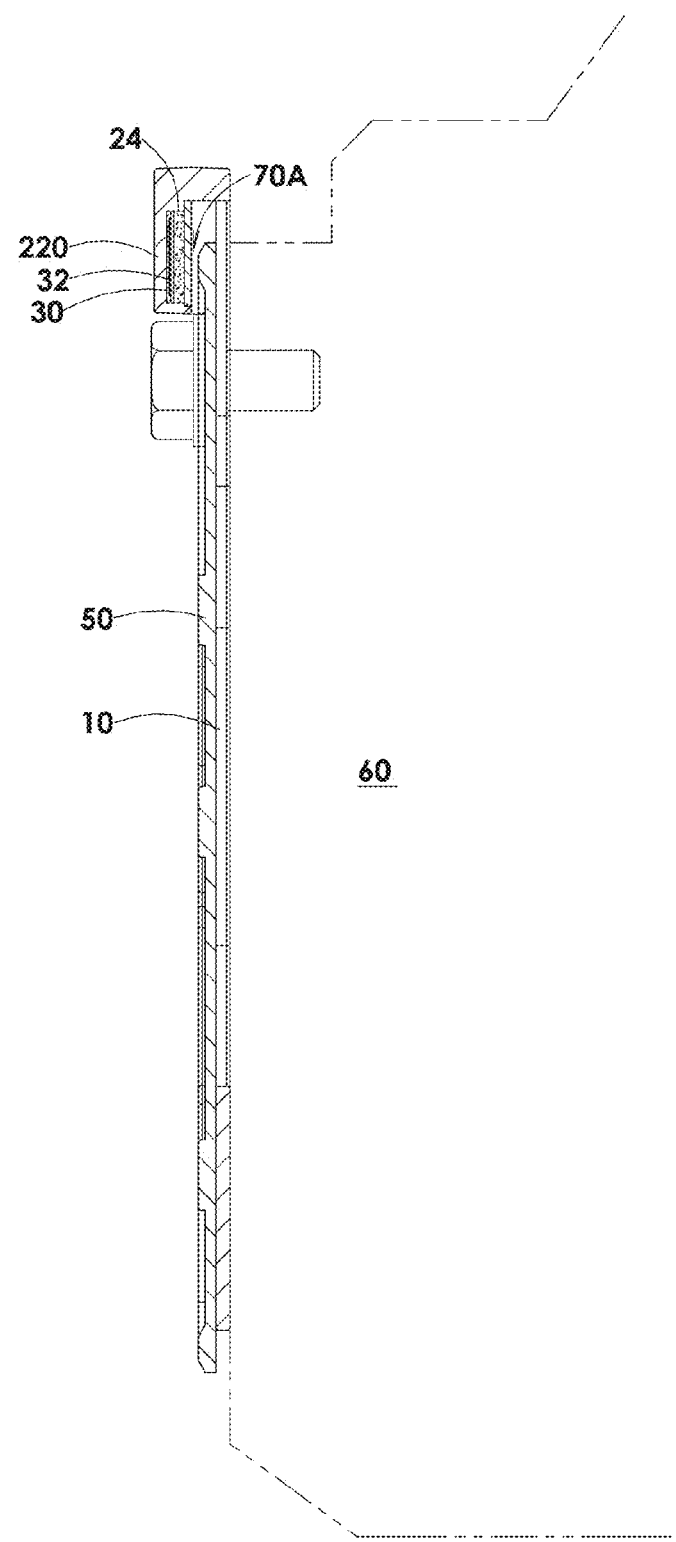
FIG. 10 is a sectional view of another embodiment of the identifier of the present invention in conjunction with the license plate mounted on the vehicle.

According to the aforesaid embodiment, as shown in FIG. 1 and FIG. 9, the plate body 21 of the plate holder 20 of the identifier 10 has two pairs of perforations 210, 210A disposed at upper and lower portions thereof corresponding to the pair of the mounting holes 51 of the license plate 50. When the user wants to mount the identifier 10 in cooperation with the license plate 50 to the vehicle, the license plate 50 is located at its original position of the vehicle. As shown in FIG. 1 and FIG. 8, the license plate 50 may be inserted in the plate receiving groove 23 at the lower end of the identifier 10, or as shown in FIG. 9 and FIG. 10, the license plate 50 may be inserted in the plate receiving groove 23 at the upper end of the identifier 10. As shown in FIG. 8 and FIG. 10, the elongate frame 220 of the identifier 10 is transversely arranged at the lower end edge or the upper end edge of the license plate 50 to maintain a good matching isolated space 70, 70A relative to the metal film antenna 32 of the RFID tag 30 in the elongate recess 24. When the license plate 50 is mounted on the vehicle 60, the RFID tag 30 transversely disposed on the surface of the upper edge or the lower edge of the license plate 50 is resistant to a metal interference and capable of long distance reading.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A license plate radio electronic identifier, comprising an identifier matching a license plate installed to a vehicle for radio frequency identification by using a radio frequency reader, the identifier comprising a plate holder, an RFID (radio frequency identification) tag, and a sealing sheet;

the plate holder being made of an insulating polymeric material by injection molding and having a plate body, the plate body having a pair of perforations corresponding to a pair of mounting holes of the license plate, one side of the plate body being formed with a tag setting frame portion having an L-shaped cross section, the tag setting frame portion having an elongate frame, a plate receiving groove being formed between the elongate frame and the plate body, the plate body being formed with a through hole extending to a section of the plate receiving groove to expose a portion of an inner side of the elongate frame, the inner side of the elongate frame being formed with an elongate recess corresponding in position to the through hole;

the RFID tag being disposed in the elongate recess of the elongate frame, the RFID tag being an elongate ultra-high frequency electronic tag corresponding in shape to the elongate recess, the RFID tag having an insulating substrate sheet, one side surface of the insulating substrate sheet being provided with a metal film antenna, the metal film antenna being formed with a slot and a groove in communication with a long side of the slot, two sides of the groove serving as a circuit pad electrically connected with a radio frequency identification chip;

the sealing sheet being a strip made of an insulating material and fixed to cover the elongate recess of the elongate frame so that the RFID tag is sealed in the elongate recess.

2. The license plate radio electronic identifier as claimed in claim 1, wherein the RFID tag is mounted in the elongate recess, and the elongate recess is filled with an insulating sealant.

3. The license plate radio electronic identifier as claimed in claim 1, wherein the slot of the metal film antenna on the RFID tag is a rectangular slot matching the license plate, and the groove is perpendicular to the slot.

4. The license plate radio electronic identifier as claimed in claim 1, wherein upper and lower portions of the plate body of the plate holder of the identifier each have the pairs of perforations corresponding to the pair of the mounting holes of the license plate.

* * * * *